US009932845B2

(12) United States Patent
Cowan et al.

(10) Patent No.: US 9,932,845 B2
(45) Date of Patent: Apr. 3, 2018

(54) IMPINGEMENT COOLED NOZZLE LINER

(75) Inventors: Curtis C. Cowan, E. Hampton, CT (US); Jorge I. Farah, Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1519 days.

(21) Appl. No.: 13/173,903

(22) Filed: Jun. 30, 2011

(65) Prior Publication Data
US 2013/0001319 A1   Jan. 3, 2013

(51) Int. Cl.
| *F02K 1/82* | (2006.01) |
| *F01D 11/00* | (2006.01) |
| *F02K 1/12* | (2006.01) |
| *F02C 7/28* | (2006.01) |
| *F16J 15/08* | (2006.01) |
| *F02K 1/00* | (2006.01) |
| *F16J 15/02* | (2006.01) |
| *F01D 5/18* | (2006.01) |

(52) U.S. Cl.
CPC .............. *F01D 11/005* (2013.01); *F01D 5/18* (2013.01); *F02C 7/28* (2013.01); *F02K 1/006* (2013.01); *F02K 1/12* (2013.01); *F02K 1/1223* (2013.01); *F02K 1/822* (2013.01); *F16J 15/025* (2013.01); *F16J 15/027* (2013.01); *F16J 15/0893* (2013.01); *Y02T 50/675* (2013.01)

(58) Field of Classification Search
CPC .......... F02C 7/28; F02K 1/006; F02K 1/1223; F02K 1/822; F16J 15/025; F16J 15/027; F16J 15/0893

USPC .............. 60/770, 771, 782, 796; 239/265.39, 239/265.41, 265.43; 277/606, 608, 609, 277/644-646

See application file for complete search history.

(56) References Cited

U.S. PATENT DOCUMENTS

| 4,544,098 | A | 10/1985 | Warburton | |
| 5,101,624 | A * | 4/1992 | Nash et al. | 60/266 |
| 5,255,849 | A * | 10/1993 | Mayer | F02K 1/1223 239/127.3 |
| 6,199,371 | B1 | 3/2001 | Brewer et al. | |
| 6,301,877 | B1 | 10/2001 | Liang et al. | |
| 7,032,835 | B2 | 4/2006 | Murphy et al. | |
| 7,377,099 | B2 * | 5/2008 | Cowan et al. | 60/230 |
| 7,581,385 | B2 | 9/2009 | Farah et al. | |
| 7,757,477 | B2 | 7/2010 | Kehret et al. | |
| 2004/0003585 | A1 * | 1/2004 | Allore et al. | 60/266 |
| 2005/0161527 | A1 | 7/2005 | Murphy et al. | |

(Continued)

FOREIGN PATENT DOCUMENTS

EP    0541346 A1 *   5/1993   ........... F02K 1/1223

OTHER PUBLICATIONS

European Search Report for European Application No. 12173265.5 dated Apr. 7, 2017.

*Primary Examiner* — Lorne Meade
*Assistant Examiner* — Marc Amar
(74) *Attorney, Agent, or Firm* — Carlson, Gaskey & Olds, P.C.

(57) ABSTRACT

A nozzle liner for a rotatable nozzle includes a seal land and a rotatable seal for moving with the nozzle. The seal has a first diffusion hole for distributing cooling air if the rotatable seal is in a first position and a second diffusion hole for distributing cooling air if the rotatable seal is in a first position and if in a second position.

22 Claims, 3 Drawing Sheets

(56) References Cited

U.S. PATENT DOCUMENTS

2006/0137324 A1* 6/2006 Farah ............................. 60/267
2009/0072044 A1* 3/2009 Kehret et al. .................. 239/13

* cited by examiner

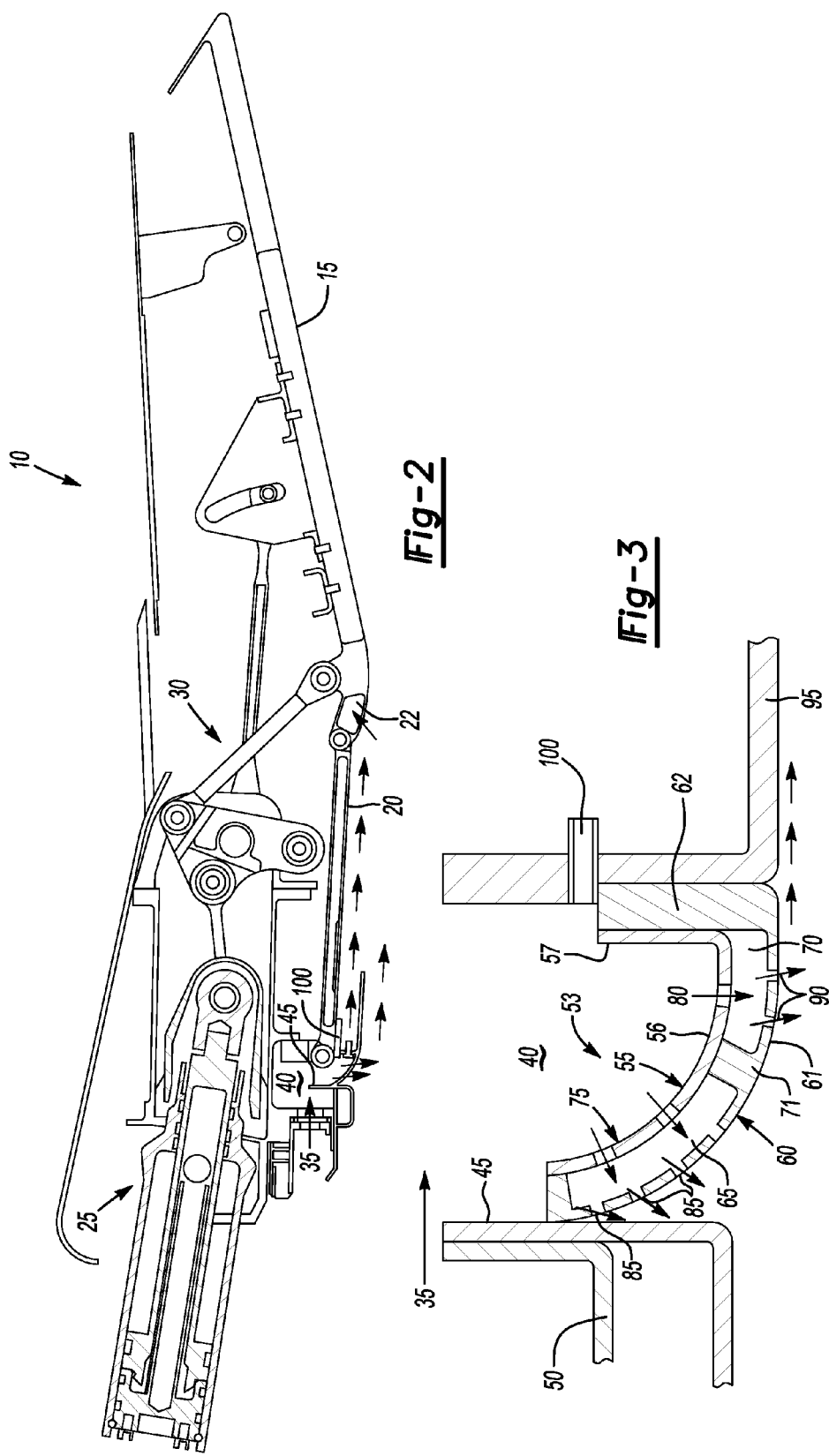

US 9,932,845 B2

IMPINGEMENT COOLED NOZZLE LINER

STATEMENT REGARDING FEDERALLY SPONSORED RESEARCH OR DEVELOPMENT

This invention was made with Government support under Contract No. N00019-02-C-3003 awarded by the Department of the United States Navy. The Government has certain rights in this invention.

SUMMARY

This invention relates generally to gas turbine engines and more particularly to exhaust duct liner cooling systems and methods.

BACKGROUND

In gas turbine engines, it is necessary to protect exhaust ducts with an insulating shield in order to prevent heated core gases from damaging the exhaust ducts. Typically, exhaust ducts are made from titanium-based alloys and may have temperature limits of approximately 300° F. or about 148.9° C. Exhaust gases, however, reach much higher temperatures. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately 700° F. or about 371.1° C. In order to alleviate some of the heat from the exhaust gases imparted to the liner, cooling air is passed between the exhaust duct and liner.

SUMMARY

According to an example disclosed herein, a nozzle liner for a rotatable nozzle includes a seal land and a rotatable seal for moving with the nozzle. The seal has a first diffusion hole for distributing cooling air if the rotatable seal is in a first position and a second diffusion hole for distributing cooling air if the rotatable seal is in a first position and if in a second position.

According to another example disclosed herein, a nozzle liner includes a rotatable nozzle, a seal land, a rotatable seal attaching to and moving with the nozzle. The seal has a first diffusion hole for distributing cooling air if the rotatable seal is in a first position wherein relatively higher heat is encountered and a second diffusion hole for distributing cooling air if the rotatable seal is in a first position wherein relatively higher heat is encountered and if in a second position wherein relatively lower heat is encountered.

According to another example disclosed herein, a method for cooling a rotatable nozzle includes the steps of rotating a curved seal about a seal land while maintaining contact therewith, directing cooling air through a first diffusion hole in the seal to cool the nozzle if the rotatable seal is in a first position where higher heat is encountered and directing cooling air through a second diffusion hole in the seal to cool the nozzle if the rotatable seal is in a first position where higher heat is encountered and if in a second position where relatively lower heat is encountered.

The various features and advantages of the disclosed examples will become apparent to those skilled in the art from the following detailed description. The drawings that accompany the detailed description can be briefly described as follows.

BRIEF DESCRIPTION OF THE DRAWINGS

FIG. 2 is a description of the nozzles as shown in FIG. 2 incorporating an embodiment as shown herein in a second position.

FIG. 3 is a view of a nozzle cooling liner taken along the line 3-3 of FIG. 2.

DETAILED DESCRIPTION

Figure 1:
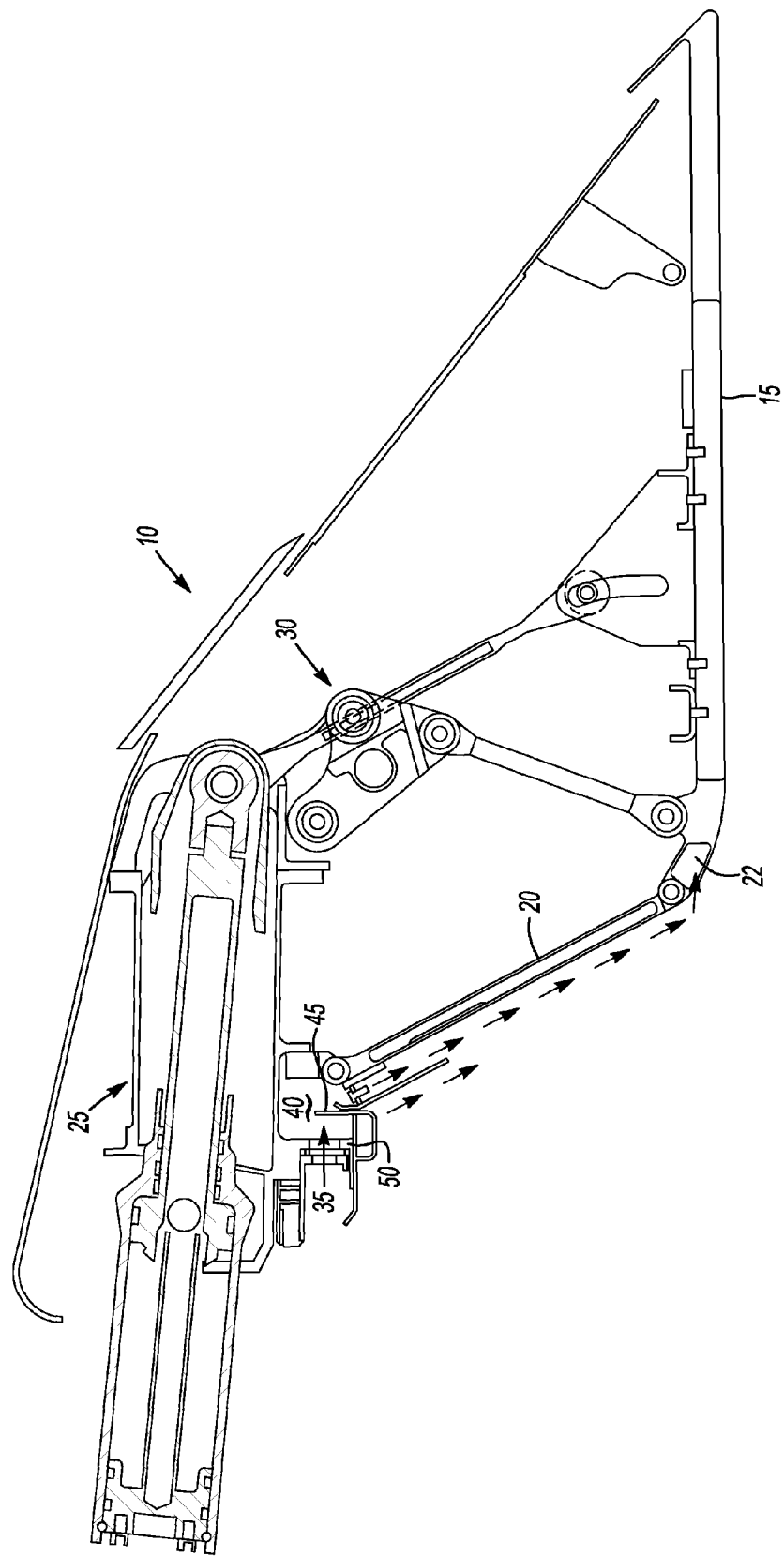
FIG. 1 is a sectional view of a nozzle liner incorporating a cooling system as described herein in a first position.

Referring now to FIGS. 1 and 2, a nozzle 10 is shown. The nozzle 10 has a divergent flap seal 15 that is connected conventionally to convergent flap seal 20. The divergent flap seal 15 has an opening 22 for receiving cooling air as will be discussed infra.

An actuator 25 drives a linkage 30 to move the nozzle 10 between various positions as shown in FIGS. 1 and 2. In FIG. 1, a gas turbine engine (not shown) is producing minimal thrust and the convergent flap seal 20 has moved inwardly pulling the divergent flap seal 15 axially inwardly. In FIG. 2, the actuator 25 through linkage 30 has moved divergent flap seal 15 upwardly and the convergent flap seal 20 upward so that maximum thrust can be obtained. A secondary air source 35, which may be from an engine compressor (not shown), or some other source, is shown. Air from the secondary air source 35 is directed into a plenum 40 that is divided by a seal land 45. The seal land 45, as can be seen more readily in FIG. 3, is attached to a housing 50 through which the secondary air source 35 is directed.

Figure 4:
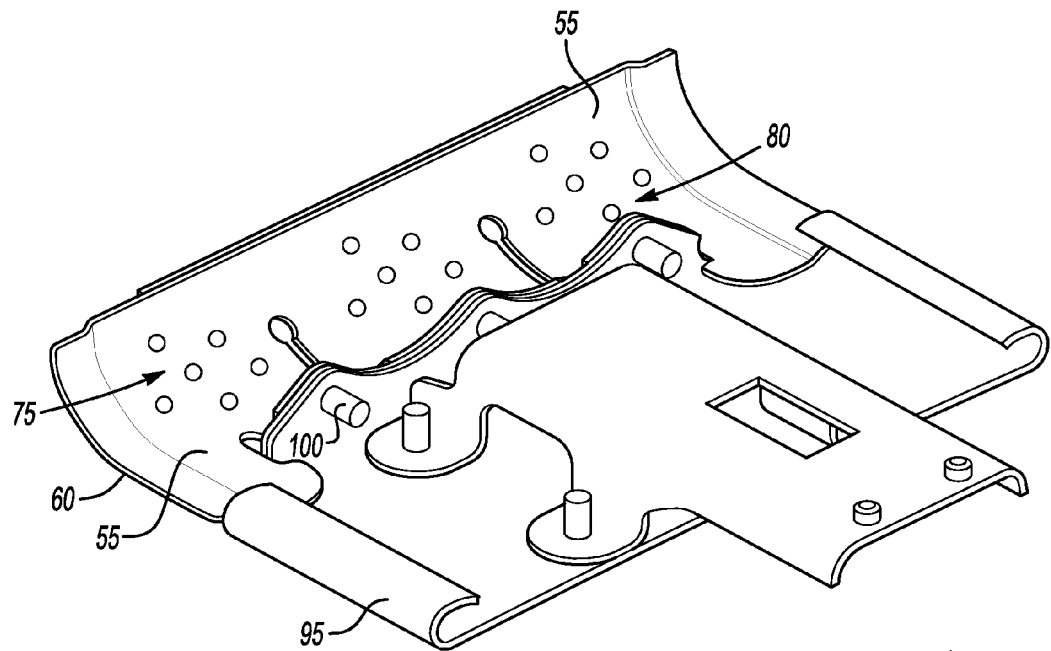
FIG. 4 shows a back view of the nozzle liner of FIG. 3.
Figure 5:
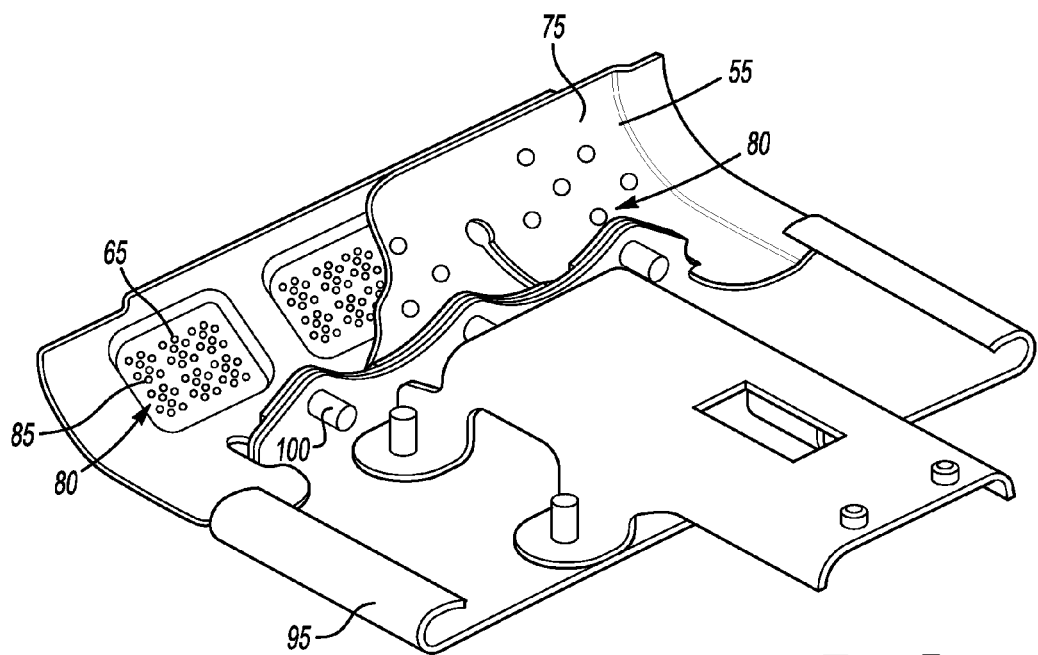
FIG. 5 shows a partially segmented back view of the nozzle liner of FIG. 4.

Referring now to FIGS. 3-5, cooling liner 53, which acts as a seal against the seal land 45, has an inner liner 55, a curved body 56 and an upwardly extending flange 57. The outer liner 60 has a similarly curved body 61 and an upwardly extending flange 62 that attaches fixedly to the upper flange 57 of the inner liner 55. The outer liner curved body is curved so that line contact with the seal land 45 is maintained as the convergent flap seal 20 rotates (see FIGS. 1-3).

A separator plate 71 is disposed between the inner liner 55 and the outer liner 60 to create a first chamber 65 and a second chamber 70. The inner liner 55 has a first set of infusion holes 75 and a second set of infusion holes 80. The first set of infusion holes 75 meters air to the first chamber 65. The second set of infusion holes 80 in the inner liner 55 feed the second chamber 70. The outer liner 60 has a first set of diffusion holes 85 and a second set of diffusion holes 90. The first set of diffusion holes 85 expels air from chamber 65 and the second set of diffusion holes 90 in the outer liner 60 diffuse air from the second chamber 70 from the cooling liner 53.

Air expelled from the first set of diffusion holes 85 of the outer liner 60 and the second set of diffusion holes 90 in the outer liner 60 travel along the convergent liner 95. The plenum 40 also delivers air through a divergent supply nozzle 100 to travel along the convergent flap seal 20 to the opening 22 of the divergent flap seal 15.

Referring now to FIG. 2, if maximum thrust is being provided, for instance, by an engine (not shown) associated with the nozzle 10, the nozzle is in the maximum thrust position as shown. The divergent flap seal 15 diverges from the thrust area as does the convergent flap seal 20. In this position, secondary cooling air 35 passes into plenum 40, through the first set of infusion holes 75 into chamber 65 and through the first set of diffusion holes 85 to provide cooling air to the convergent liner 95, the convergent flap seal 20 and the divergent flap seal 15. Similarly, secondary cooling air 35 also passes into plenum 40, through the second set of infusion holes 80 into chamber 70 and through the second set of diffusion holes 90 also to provide cooling air to the convergent liner 95, the convergent flap seal 20 and the divergent flap seal 15. The outer liner 60 still attaches to the seal land 45 as shown in FIG. 3 and the maximum amount of air is expelled therefrom.

Referring to FIG. 1, maximum thrust is not necessary and the convergent flap seal 20 is moved downwardly into the flow stream. Because the inner liner 55 and the outer liner 60 of the cooling liner 53 is rotated with the movement of the convergent flap seal 20, air moving out of the first chamber 65 through the outer liner first set 85 of diffusion holes is shut off. Line contact between the seal land 45 and the cooling liner is in the vicinity of the separator 71. Secondary cooling air 35 then passes into plenum 40, through the second set of infusion holes 80 into chamber 70 and through the second set of diffusion holes 90 also to provide cooling air to the convergent liner 95, the convergent flap seal 20 and the divergent flap seal 15. Because less thrust is required, less heat is generated and less secondary cooling air is required for the convergent liner 95 and the convergent flap seal 20 and the divergent flap seal 15. Flow through the divergent supply nozzle 100 is not affected by motion of the convergent flap seal 20 to provide secondary cooling air to the divergent flap seal 15 through opening 22.

Rotation of the convergent flap seal 20 rotates the cooling liner 53 to vary line contact with the seal land 45 and open and close portions of or all of the first set of diffusion holes 85 thereby metering cooling air as may be necessary for the convergent liner 95 and the convergent flap seal 20 and the divergent flap seal 15 during differing operation of the engine (not shown).

Traditionally, the inner and outer liners 55, 60 might be made of a scarce columbium alloy (Nb) for its inherent low thermal expansion and its ability to withstand heat. However, columbium alloy has limited strength and is difficult to process. For instance, producing cooling holes in Nb is difficult due to its need to be protected from oxygen exposure. Columbium requires application of protective coatings to survive gas turbine environment, said coatings are expensive and environmentally unfriendly. Additionally any hole or penetration in Nb must be produced prior to coating, hence producing small diameter/tight tolerance features are not feasible. By utilizing the designs disclosed herein, secondary cooling air is distributed throughout the exposed curved body 61 of cooling liner 53. The first and second sets of diffusion holes 85, 90 and the first and second sets of infusion (or metering) holes 75, 80 in the inner liner 55, actively meter secondary air flow to coincide with thermal gradients needed for various positions of the divergent flap seal 15 and the convergent flap seal 20. As a result, less expensive and more available materials can be used to create the inner liner 55 and the outer liner 60 rather than columbium alloy. For example, a 625 nickel alloy steel (AMS 5599) may be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A nozzle liner for a rotatable nozzle, said nozzle liner comprising: a flat seal land, a rotatable seal in contact with the flat seal land for moving with said rotatable nozzle, said rotatable seal including: an inner liner; and an outer liner having a first diffusion hole through a curved portion of the outer liner for distributing cooling air if said rotatable seal is in a first position and a second diffusion hole through the curved portion of the outer liner for distributing cooling air if said rotatable seal is in said first position and if in a second position, wherein said first diffusion hole is spaced axially forward of said second diffusion hole relative to a longitudinal axis of said nozzle.

2. The nozzle liner of claim 1 wherein said curved portion of the rotatable seal maintains contact with said flat seal land.

3. The nozzle liner of claim 1 wherein said inner liner is in register with said outer liner.

4. The nozzle liner of claim 3 wherein said inner liner is curved.

5. The nozzle liner of claim 3 wherein said inner liner and said outer liner have a separator disposed therebetween thereby creating a first chamber and a second chamber between said inner liner and said outer liner, said separator extends in a circumferential direction.

6. The nozzle of claim 5 further comprising: a first set of infusion holes extending through said inner liner for transmitting cooling air into said first chamber and a second set of infusion holes for transmitting cooling air into said second chamber.

7. The nozzle of claim 6 wherein said first chamber is in communication with said first diffusion hole for transmitting cooling air therethrough.

8. The nozzle of claim 6 wherein said second chamber is in communication with said second diffusion hole for transmitting cooling air therethrough.

9. The nozzle of claim 6 wherein said first set of infusion holes are located axially forward of said second set of infusion holes relative to a longitudinal axis of said nozzle.

10. The nozzle of claim 3 wherein each of said inner surface liner and said outer liner have a transversely extending surface that attaches to each other transversely extending surface.

11. The nozzle of claim 1 further comprising a plenum distributing cooling air to said first diffusion hole and to said second diffusion hole.

12. The nozzle liner of claim 1 wherein at least one of said first diffusion hole and said second diffusion hole is configured to impinge cooling fluid on said seal land.

13. The nozzle liner of claim 1 wherein at least one of said first diffusion hole and said second diffusion hole defines an axis directed axially upstream relative to a longitudinal axis of said nozzle.

14. A nozzle liner, said liner comprising: a rotatable nozzle, a flat seal land, a rotatable seal attaching to and moving with said rotatable nozzle, said rotatable seal having; an inner liner having a plurality of infusion holes; and an outer liner having a first diffusion hole through a curved portion of the outer liner for distributing cooling air if said rotatable seal is in a first position wherein high heat is encountered and a second diffusion hole through the curved portion of the outer liner for distributing cooling air if said rotatable seal is in said first position wherein high heat is encountered and if in a second position wherein low heat is encountered, wherein said first diffusion hole is axially spaced from said second diffusion hole relative to a longitudinal axis of the nozzle.

15. The nozzle liner of claim 14 wherein said curved portion of the rotatable seal maintains contact with said flat seal land as said rotatable nozzle rotates.

16. The nozzle liner of claim 14 wherein said inner liner is curved and said curved portion of the outer liner is in register with said inner liner.

17. The nozzle liner of claim 16 wherein said inner liner and said outer liner have a separator disposed therebetween thereby creating a first chamber and a second chamber between said inner liner and said outer liner, said separator extends in a circumferential direction.

18. The nozzle of claim 17 wherein said plurality of infusion holes includes a first set of infusion holes transmitting cooling air into said first chamber and a second set of infusion holes for transmitting cooling air into said second chamber.

19. The nozzle of claim 18 wherein said first chamber is in communication with said first diffusion hole for transmitting cooling air therethrough and said second chamber is in communication with said second diffusion hole for transmitting cooling air therethrough.

20. The nozzle of claim 18 wherein said first set of infusion holes are located axially forward of said second set of infusion holes relative to a longitudinal axis of said nozzle.

21. The nozzle of claim 14 wherein at least one of said first diffusion hole and said second diffusion hole defines an axis directed axially upstream relative to a longitudinal axis of said nozzle.

22. The nozzle of claim 17 wherein said first chamber is located adjacent a first end of said rotatable seal and said second chamber is located adjacent a second end of said rotatable seal.

* * * * *